United States Patent
Elder et al.

(10) Patent No.: US 11,199,365 B2
(45) Date of Patent: Dec. 14, 2021

(54) HEAT EXCHANGER

(71) Applicant: HAMILTON SUNDSTRAND CORPORATION, Charlotte, NC (US)

(72) Inventors: James S. Elder, South Windsor, CT (US); Leo J. Veilleux, Jr., Wethersfield, CT (US); Lubomir A. Ribarov, West Hartford, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 694 days.

(21) Appl. No.: 14/531,376

(22) Filed: Nov. 3, 2014

(65) Prior Publication Data

US 2016/0122024 A1   May 5, 2016

(51) Int. Cl.
*F28D 9/00* (2006.01)
*B64C 13/00* (2006.01)

(52) U.S. Cl.
CPC ............... *F28D 9/00* (2013.01); *B64C 13/00* (2013.01)

(58) Field of Classification Search
CPC ....... F28D 7/1653; F28D 7/163; F28D 7/0075
USPC ........................................................ 165/140
See application file for complete search history.

(56) References Cited

U.S. PATENT DOCUMENTS

| | | | | |
|---|---|---|---|---|
| 2,606,007 A | * | 8/1952 | Simpelaar | F28D 9/0062 165/166 |
| 2,985,433 A | * | 5/1961 | Simpelaar | F28D 9/0081 165/166 |
| 3,267,559 A | * | 8/1966 | Laux | B21D 53/02 29/455.1 |
| 3,460,611 A | * | 8/1969 | Tramuta | F28D 9/0037 165/166 |
| 3,818,984 A | * | 6/1974 | Nakamura | F28D 9/0018 165/157 |
| 4,344,481 A | * | 8/1982 | Urie | F28D 9/0068 165/166 |
| 4,681,155 A | * | 7/1987 | Kredo | F28F 3/025 138/163 |

(Continued)

FOREIGN PATENT DOCUMENTS

| | | | | |
|---|---|---|---|---|
| JP | 60238684 A | * | 11/1985 | ............. F28F 3/025 |
| JP | S60238684 A | | 11/1985 | |

OTHER PUBLICATIONS

English Translation of JP-60238684-A (Year: 2021).*
Japanese Patent No. S60238684; Date of Publication: Nov. 27, 1985; Abstract Only, 2 pages.

*Primary Examiner* — Len Tran
*Assistant Examiner* — Melodee Jefferson
(74) *Attorney, Agent, or Firm* — Cantor Colburn LLP

(57) ABSTRACT

An air to air heat exchanger is provided including a core having a plurality of alternately stacked first layers and second layers. Each first layer includes a plurality of first modules having corrugated fins that define a plurality of first fluid flow paths. The first modules are aligned to fluidly couple the first fluid flow paths. Each second layer includes at least one second module having corrugated fins that define a plurality of second fluid flow paths. At least one second layer includes a third module having a plurality of corrugated fins that define a plurality of third fluid flow paths. The third module is arranged such that the third fluid flow paths are parallel to the second fluid flow paths. A number of corrugated fins formed in the third module is less than a number of corrugated fins formed in the second module.

5 Claims, 6 Drawing Sheets

(56) References Cited

U.S. PATENT DOCUMENTS

| | | | | |
|---|---|---|---|---|
| 4,962,810 A * | 10/1990 | Bond | | F28D 7/0066 165/143 |
| 4,976,313 A | 12/1990 | Dahlgren et al. | | |
| 5,031,693 A | 7/1991 | Vandyke | | |
| 5,340,664 A | 8/1994 | Hartvigsen | | |
| 5,375,655 A * | 12/1994 | Lee | | F28F 3/02 165/185 |
| 5,743,328 A * | 4/1998 | Sasaki | | F28D 1/0417 165/144 |
| 6,688,380 B2 | 2/2004 | Lavochkin et al. | | |
| 7,096,932 B2 * | 8/2006 | Scoville | | F28D 1/0443 165/135 |
| 7,111,670 B2 | 9/2006 | Yoshioka et al. | | |
| 7,469,554 B2 * | 12/2008 | Martins | | F25B 39/04 165/140 |
| 8,453,719 B2 * | 6/2013 | Sperandei | | F28F 1/128 165/109.1 |
| 8,646,516 B2 | 2/2014 | Abels et al. | | |
| 8,656,986 B2 | 2/2014 | Yuan et al. | | |
| 8,678,077 B2 | 3/2014 | Shore et al. | | |
| 9,382,841 B2 * | 7/2016 | Bruno | | B64D 13/06 |
| 9,472,489 B2 * | 10/2016 | Nakamura | | H01L 23/473 |
| 2004/0216863 A1 * | 11/2004 | Hu | | F28D 1/0443 165/110 |
| 2005/0045314 A1 * | 3/2005 | Elbourini | | F28D 1/05366 165/152 |
| 2005/0257921 A1 * | 11/2005 | Hu | | F28D 1/0443 165/140 |
| 2005/0274501 A1 * | 12/2005 | Agee | | F02M 26/22 165/146 |
| 2006/0289147 A1 * | 12/2006 | Zuo | | F28D 15/0266 165/104.26 |
| 2007/0137841 A1 * | 6/2007 | Bjork | | F28F 1/126 165/153 |
| 2009/0014164 A1 * | 1/2009 | Zobel | | B23P 15/26 165/177 |
| 2009/0025916 A1 * | 1/2009 | Meshenky | | B21D 13/08 165/151 |
| 2009/0056927 A1 * | 3/2009 | Zobel | | B21C 37/151 165/180 |
| 2009/0173477 A1 * | 7/2009 | Raver | | F28D 1/05375 165/151 |
| 2010/0084120 A1 * | 4/2010 | Yin | | F22B 27/00 165/146 |
| 2010/0108042 A1 * | 5/2010 | Akiyoshi | | B23K 1/0012 123/568.12 |
| 2010/0181058 A1 | 7/2010 | Huazhao et al. | | |
| 2010/0243200 A1 * | 9/2010 | Baker, Jr. | | B60H 1/00342 165/41 |
| 2011/0011570 A1 * | 1/2011 | Levings | | F28D 7/1684 165/166 |
| 2011/0088880 A1 * | 4/2011 | Seto | | B60H 1/00328 165/151 |
| 2011/0132584 A1 * | 6/2011 | Wilmot | | B64D 13/06 165/166 |
| 2012/0037349 A1 * | 2/2012 | Takada | | F28D 9/0062 165/170 |
| 2012/0043064 A1 * | 2/2012 | Takada | | F28D 9/0062 165/166 |
| 2012/0193083 A1 * | 8/2012 | Zaffetti | | F28D 9/0062 165/185 |
| 2012/0205086 A1 * | 8/2012 | Nakamura | | H01L 23/473 165/181 |
| 2012/0261104 A1 * | 10/2012 | Kelly | | B23K 1/0012 165/177 |
| 2012/0291991 A1 * | 11/2012 | Denkenberger | | B21D 53/045 165/81 |
| 2013/0020061 A1 * | 1/2013 | Bergh | | F28D 1/0316 165/166 |
| 2013/0062039 A1 * | 3/2013 | Kent | | F28F 3/046 165/109.1 |
| 2013/0299144 A1 * | 11/2013 | Van Lieu | | F28F 3/025 165/165 |
| 2014/0041227 A1 * | 2/2014 | Lindell | | B23K 1/008 29/890.046 |
| 2014/0060789 A1 * | 3/2014 | Rousseau | | F01K 23/065 165/166 |
| 2014/0116664 A1 | 5/2014 | Landre | | |
| 2014/0260398 A1 * | 9/2014 | Kozubal | | F25B 15/00 62/271 |
| 2014/0262181 A1 * | 9/2014 | Taras | | F28F 17/005 165/173 |
| 2014/0318751 A1 * | 10/2014 | Kinder | | F28D 1/05366 165/151 |

\* cited by examiner

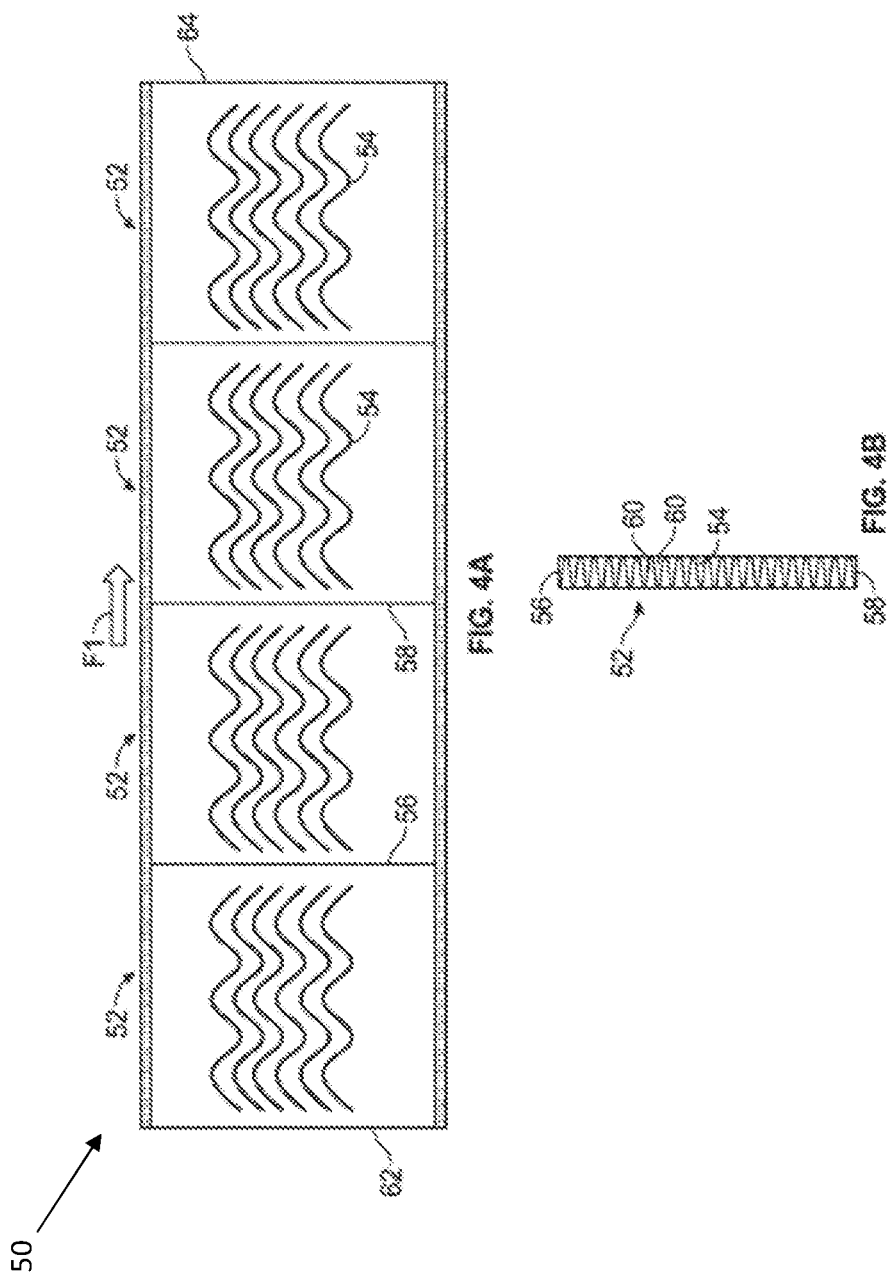

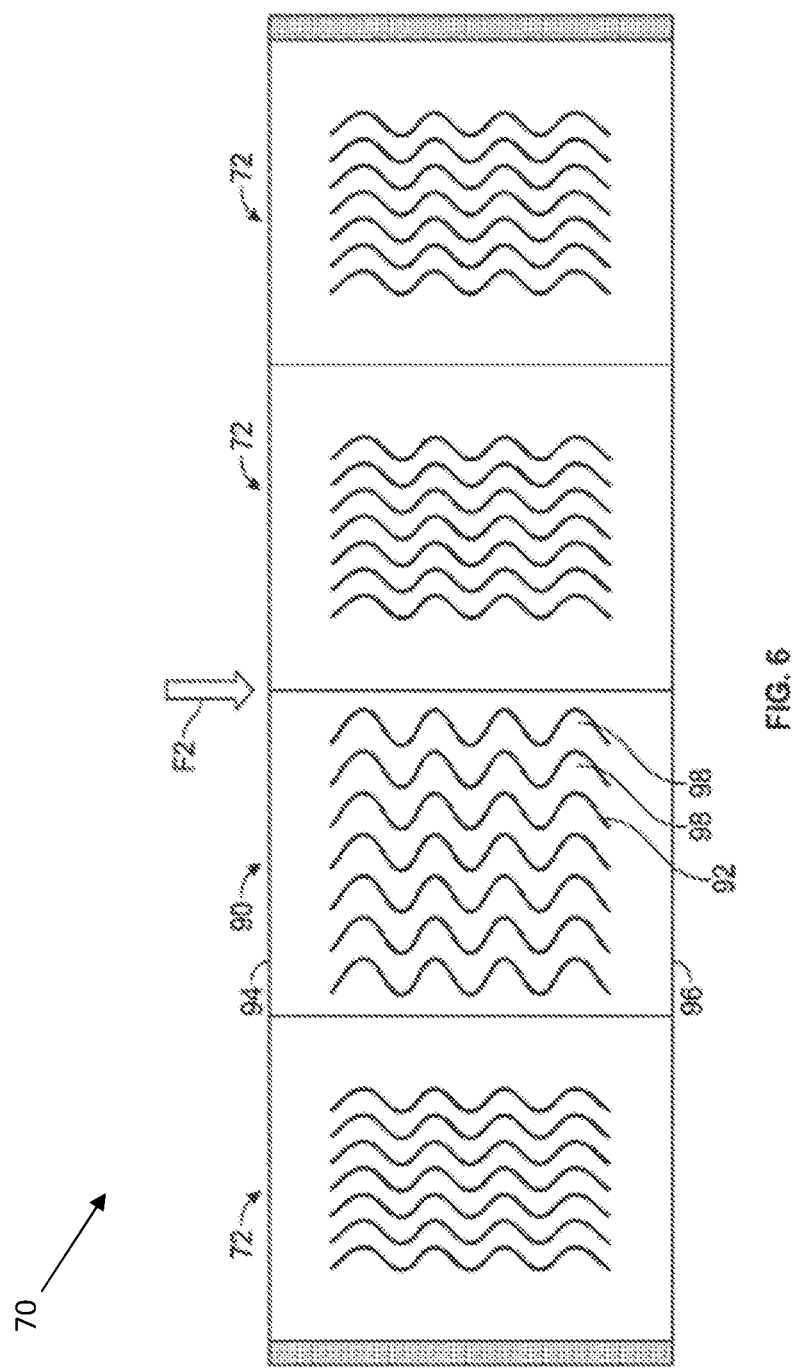

HEAT EXCHANGER

BACKGROUND OF THE INVENTION

Exemplary embodiments of this invention generally relate to environmental control systems of an aircraft and, more particularly, to an air to air heat exchanger of such an environmental control system.

Environmental control systems (ECS) for aircrafts and other vehicles are utilized to provide a conditioned airflow for passengers and crew within an aircraft. One type of environmental control system generally operates by receiving fresh ambient air into a ram air intake located near the ECS equipment bay. The fresh ambient ram air is supplied to at least one electric motor-driven air compressor that raises the air pressure to, for example, the desired air pressure for the cabin. From the at least one air compressor, the air is supplied to an optional ozone converter. Because air compression creates heat, the air is then supplied to an air conditioning pack in which the air is cooled before being transported to the cabin.

Depending on the ambient air conditions when an aircraft is in flight, air having a subzero temperature may be provided to a heat exchanger of the ECS. As a result of moisture present in a warm airflow provided to the heat exchanger, water from the warm airflow may condense on the heat exchanger fins and upon further cooling turn into frost or ice. Accumulated frost or ice may impede or block the flow of air through a portion of the heat exchanger, thereby reducing the operating efficiency and functionality of the heat exchanger and the ECS.

BRIEF DESCRIPTION OF THE INVENTION

According to one embodiment of the invention, an air to air heat exchanger is provided including a core having a plurality of alternately stacked first layers and second layers. Each first layer includes a plurality of first modules having corrugated fins that define a plurality of first fluid flow paths. The first modules are aligned to fluidly couple the first fluid flow paths. Each second layer includes at least one second module having corrugated fins that define a plurality of second fluid flow paths. At least one second layer includes a third module having a plurality of corrugated fins that define a plurality of third fluid flow paths. The third module is arranged such that the third fluid flow paths are parallel to the second fluid flow paths. A number of corrugated fins formed in the third module is less than a number of corrugated fins formed in the second module.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIGS. 4A and 4B are top and side views of a first layer according to an embodiment of the invention;

FIG. 6 is a top view of a second layer having at least one third module according to an embodiment of the invention.

The detailed description explains embodiments of the invention, together with advantages and features, by way of example with reference to the drawings.

DETAILED DESCRIPTION OF THE INVENTION

Figure 1:
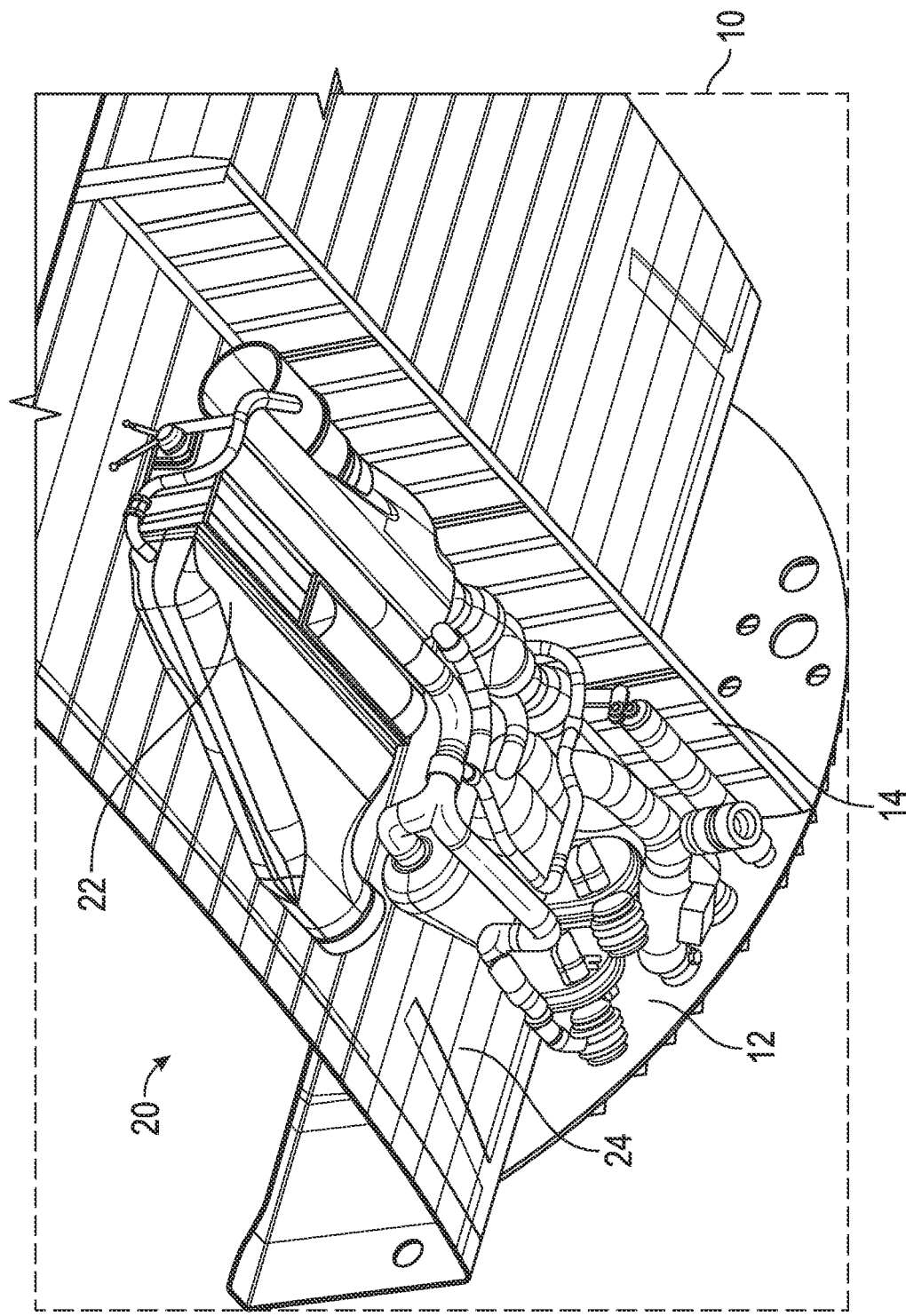
FIG. 1 is a perspective view of a portion of an environmental control system of an aircraft.

Referring now to FIG. 1, a portion of an environmental control system (ECS) used on an aircraft 10 (illustrated schematically with dashed lines), such as an air conditioning ECS pack 20 for example, is illustrated. The ECS typically includes various components such as, for example, a vapor cycle system, turbo compressors, a primary heat exchanger 22, and other components which are closely packaged to define an ECS pack 20. The ECS pack 20 is mounted within an ECS bay 24 of the aircraft. In one embodiment, the ECS pack 20 is mounted adjacent a front spar 12 and a keel beam 14 at the interface between the aircraft lower fuselage and a wing.

Figure 2:
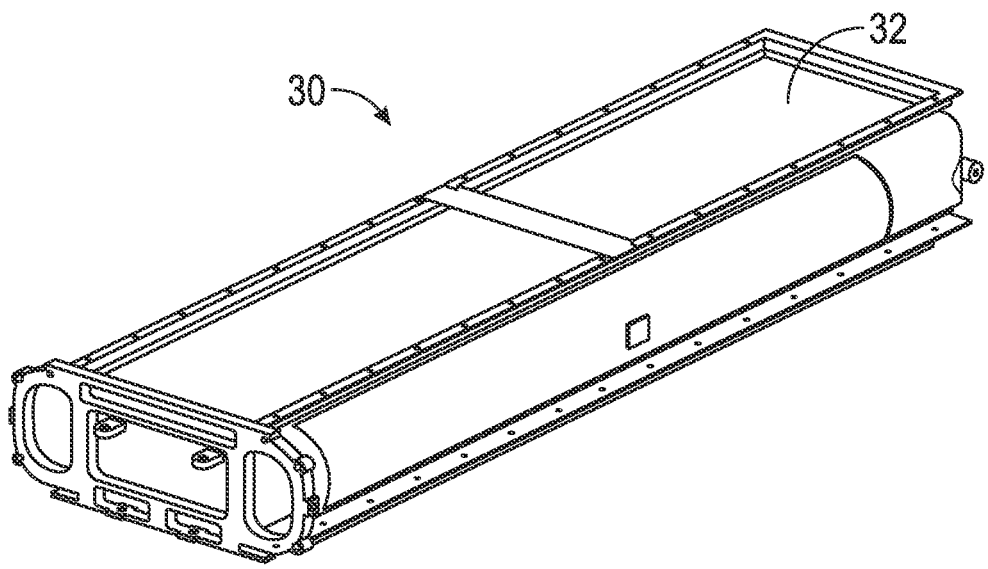
FIG. 2 is a perspective view of an air to air heat exchanger configured for use in an environmental control system according to an embodiment of the invention.
Figure 3:
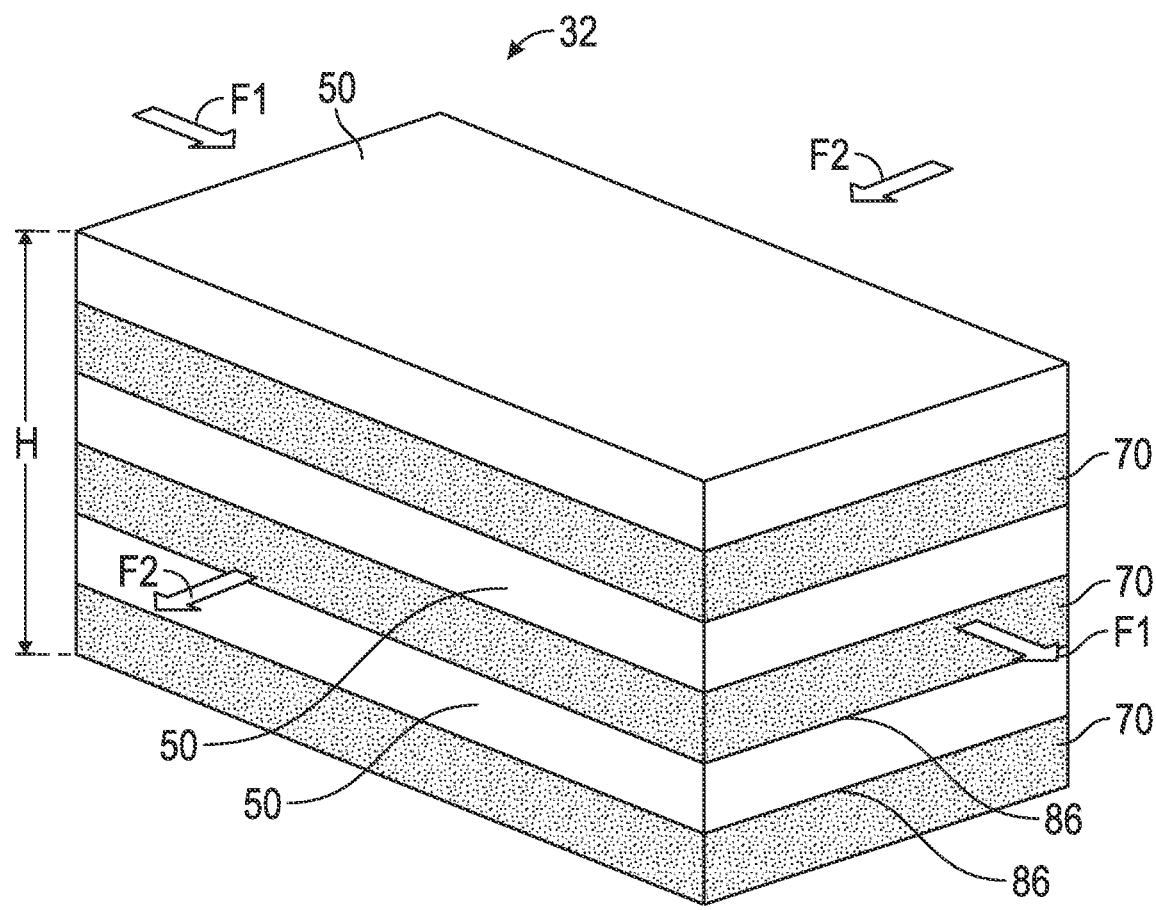
FIG. 3 is an perspective view of an air to air heat exchanger core according to an embodiment of the invention.

Referring now to FIG. 2 an example of an air to air heat exchanger 30, such as the primary heat exchanger 22 of the ECS pack 20 for example (FIG. 1), is illustrated. The air to air heat exchanger 30 is generally rectangular in shape and is structurally supported by a core 32.

Details of the construction of the core 32 of the air to air heat exchanger 30 are illustrated in FIGS. 3-7. More particularly, the core 32 of the air to air heat exchanger 30 has a plate-fin construction with cross-flow of a first warm fluid and a second cool fluid there through. The core 32 of the heat exchanger 30 includes a plurality of first layers 50 and second layers 70. The first layers 50 have a fluid pathway such that a first warm fluid, such as warm compressed air for example, flows through the core 32 in a first direction, indicated by arrow F1. The second layers 70 have a fluid pathway such that a second cool fluid, for example cool ambient ram air, flows through the core 32 in a second direction, indicated by arrow F2. In one embodiment, the direction of the second fluid flow is perpendicular to the direction of the first fluid flow. The first and second layers 50, 70 are stacked along a dimension of the core 32, such as the height H for example, in an alternating configuration. Thin plates 86, for example, braze sheets, separate adjacent fluid layers 50, 70 within the core 32.

Figure 5A:
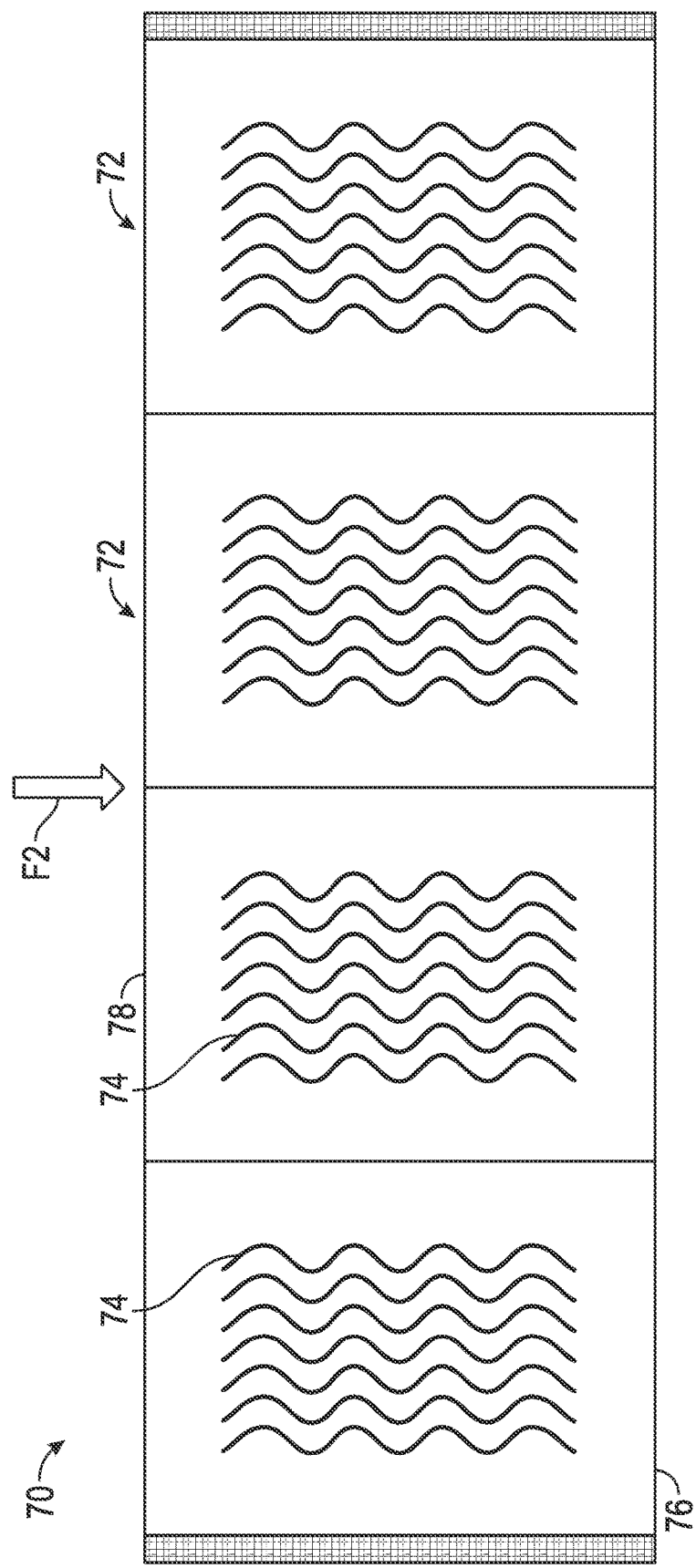
FIGS. 5A and 5B are top and side views of a second layer according to an embodiment of the invention.
Figure 5B:
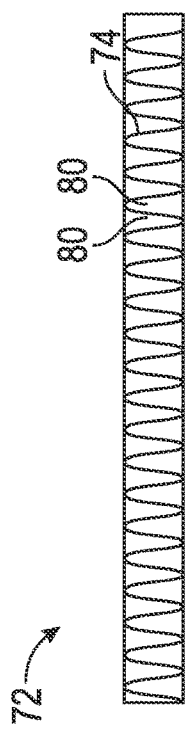

Referring to FIGS. 4A, 4B, an exemplary top and side view of a first layer 50 is illustrated. Each first layer 50 includes a plurality of substantially identical first modules 52 having a plurality of corrugated fins 54 formed therein. The corrugated fins 54 extend from a first side 56 to a second side 58 of each first module 52 to define a plurality of first flow paths 60 across the first module 52. As shown, the first modules 52 are aligned to form a plurality of fluid flow paths 60 extending from a first end 62 to a second, opposite end 64 of the first layer 50. Similarly, as shown in FIGS. 5A and 5B, an example of a second layer 70 includes a plurality of substantially identical second modules 72 having a plurality of corrugated fins 74 formed therein. The corrugated fins 74 extend from a first side 76 to a second side 78 of each module 72 to define a plurality of second flow paths 80. As shown, the plurality of second modules 72 are positioned adjacent one another in an identical orientation such that the second flow paths 80 of each second module 72 are arranged in parallel. In one embodiment, the second modules 72 may be substantially similar to the first modules 52, for example with respect to the size and number of corrugated fins 54, 74 as shown in FIG. 4B.

During operation of the illustrated heat exchanger 30, a first fluid passes through the fluid flow paths 60 defined by the plurality of parallel first modules 52 (FIG. 4B). At the same time, a second fluid flows through the fluid flow paths 80, 98 defined by the second and third modules 72, 90 of each second layer 70 (FIG. 5B and FIG. 6). The second fluid travels through the core 32 in a direction perpendicular to the flow of the first fluid. Although the air to air heat exchanger illustrated in the FIGS. 4A, 4B, 5A, and 5B has a single pass configuration, heat exchangers 30 having other configurations are within the scope of the invention.

Figure 7:
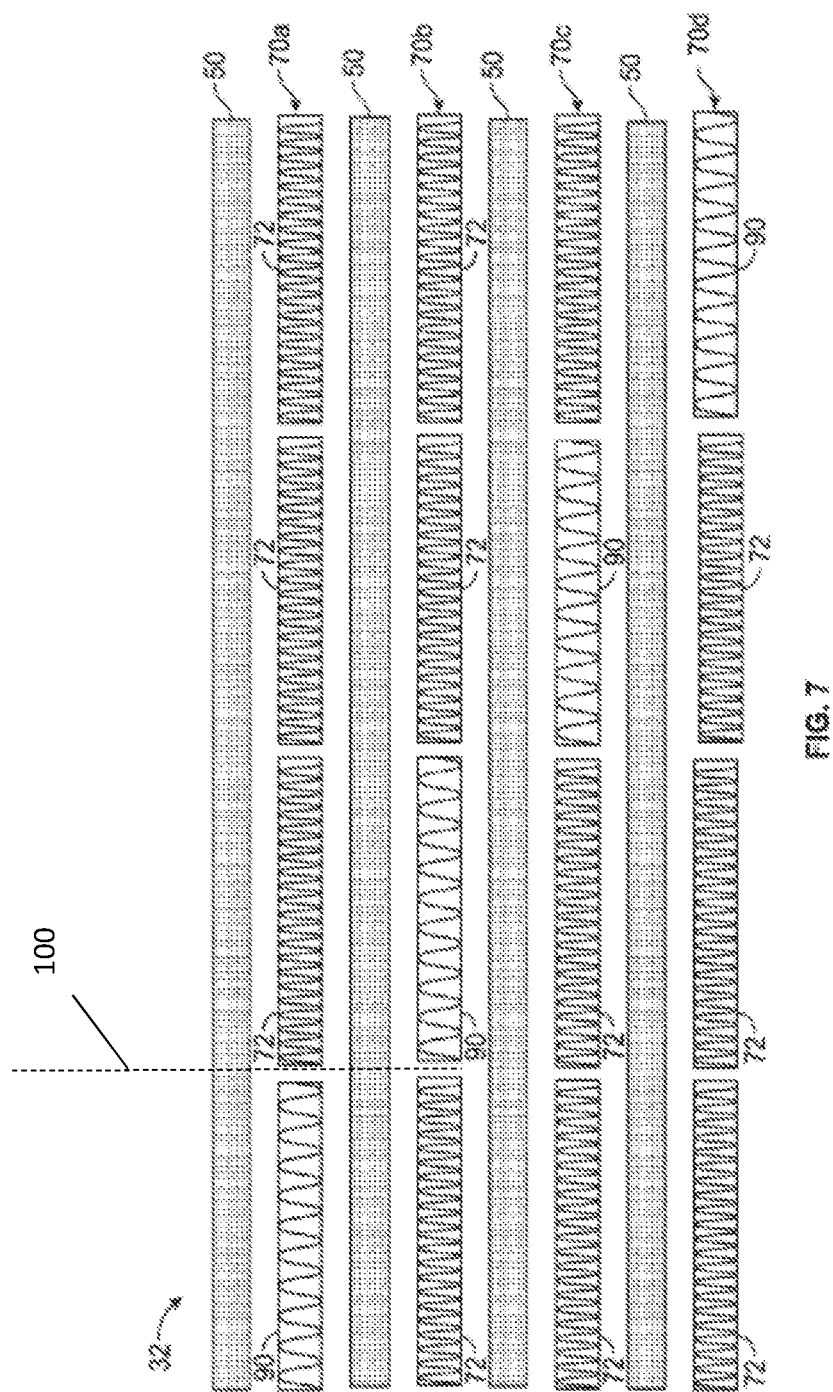
FIG. 7 is a side view of a heat exchanger core according to an embodiment of the invention.

Referring now to FIGS. 6 and 7, one or more of the second layers 70 of the heat exchanger core 32 includes at least one third module 90 having a plurality of corrugated fins 92 extending from a first side 94 to a second side 96 of the third module 90 to form a plurality of third flow paths 98 therein. The flow paths 98 of the one or more third modules 90 are arranged parallel to the flow paths 80 of the adjacent second modules 72 within a second layer 70. In one embodiment, the overall size of the third module 90 is substantially identical to the size of an adjacent second module 72. However, the number of corrugated fins 92 formed in the third module 90 is less than the number of corrugated fins 74 formed in the second module 72. For example, the fin ratio of the second and third modules 72, 90 may be between about 2:1 and about 6:1. By reducing the number of corrugated fins 92 on the third module 90, the flow paths 98 of the third module 90 are larger than the flow paths 80 of the adjacent second modules 72.

The third modules 90 of each of the second layers 70 in a heat exchanger core 32 may be substantially identical, or alternatively may be different. In addition, the position of the at least one third module 90 within the second layer 70 may vary, as shown in FIG. 7. The third modules 90 are positioned within the second layers 70 to minimize or entirely prevent freezing of any condensation collected within the core 32.

To limit such freezing, the third modules 90 of adjacent second layers 70 within the heat exchanger core 32 may be arranged at directly adjacent positions. For example, as shown in the FIG. 7, a third module 90 of the uppermost second layer 70a within the core 32 is arranged at a first end thereof, adjacent the hot air inlet. Alternatively, the third module 90 of the uppermost second layer 70a may be located in a middle portion of the second layer 70a, such as adjacent a freeze boundary for example. In the next adjacent second layer 70b of the core 32, a third module 90 is arranged at a position directly adjacent the position of the third module 90 within the first second layer 70a. Similarly, in the third second layer 70c, a third module 90 is arranged at a position adjacent the third module 90 in the second layer 70b. In the illustrated, non-limiting embodiment, the third module 90 of the second layer 70c and the third module 90 of the second layer 70a are arranged on opposing sides of the third module 90 of the second layer 70b. A third module 90 of the lower most second layer 70d of the core 32 is located adjacent the third module 90 of the adjacent second layer 70c. As shown, the third module 90 of the bottom second layer 70d may be positioned adjacent a second end of the core 32, adjacent the hot air outlet.

In the illustrated, non-limiting embodiment, the third modules 90 are arranged in a "step-wise" configuration intended to follow a freeze line 100 of the heat exchanger's core 32 in a thermal "boot-strapping" approach. However, heat exchanger core 32 having second layers 70 with one or more third modules 90 arranged at any position, such as in an interspersed array for example, configured to reduce or minimize or completely eliminate freezing of condensed water therein is within the scope of the invention. Any array of interspersed elements such as third module 90 among second layers 70 within the heat exchanger's core 32 is also contemplated and is therein within the scope of the invention. As a result of the positioning of the third modules 90, the heat from adjacent first layers 50 conducts to the second layers 70, thereby defrosting any frozen portions of the core 32.

Inclusion of one or more third module 90 in the second layers 70 of a heat exchanger core 32 provides an efficient method for minimizing or preventing the formation of frost or ice in a compact air to air heat exchanger 30. As a result, the need for additional defrost systems or sub-routines is eliminated such that the heat exchanger 30 will operate in a predictable manner. This results in a compact, light-weight, highly-efficient air-to-air heat exchanger.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while the various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An air to air heat exchanger, comprising:
   a core having a plurality of alternately stacked first layers and second layers, the first layers and second layers stacked along a first direction, each first layer includes a plurality of first modules having a plurality of corrugated fins formed therein to define a plurality of first fluid flow paths to flow a first airflow therethrough in a first airflow direction, the plurality of first modules being aligned and adjacent along a second direction perpendicular to the first direction such that the first fluid flow paths of adjacent first modules are fluidly coupled, each of the second layers includes at least one second module having a plurality of corrugated fins formed therein to define a plurality of second fluid flow paths, the plurality of second fluid flow paths perpendicular to the plurality of first fluid flow paths;
   wherein the first airflow direction and the second airflow direction are both perpendicular to the first direction along which the first layers and the second layers are stacked; and
   wherein at least two second layers each include includes a third module having a plurality of corrugated fins formed therein to define a plurality of third fluid flow paths, the third module being arranged such that the third fluid flow paths are parallel to the second fluid flow paths, wherein a number of corrugated fins formed in the third module is less than a number of corrugated fins formed in the at least one second module, wherein each third flow path of the plurality of third flow paths has a larger third flow path cross-sectional area than a second flow path cross-sectional area of each second flow path of the plurality of second flow paths, the second layer formed by arranging the at least one second module and the third module along the second direction;

wherein each of the third modules of the at least two second layers is in a different lateral position from the third modules in adjacent second layers of the at least two second layers.

2. The air to air heat exchanger according to claim 1, wherein one of the third modules is located in an uppermost second layer of the plurality of second layers in the heat exchanger core, and is positioned adjacent a first end of the heat exchanger core.

3. The air to air heat exchanger according to claim 1, wherein one of the third modules is located in an uppermost second layer of the plurality of second layers in the heat exchanger core, and is positioned adjacent a freeze boundary of the heat exchanger core.

4. The air to air heat exchanger according to claim 1, wherein each of the third modules of the at least two second layers is arranged in a stepwise orientation with respect to the third modules of the adjacent second layers of the at least two second layers.

5. The air to air heat exchanger according to claim 1, wherein a fin ratio of the second modules to the fins of the third modules is between 2:1 and 6:1.

* * * * *